(12) United States Patent
Saita et al.

(10) Patent No.: US 9,818,548 B2
(45) Date of Patent: Nov. 14, 2017

(54) THIN FILM CAPACITOR

(71) Applicant: TDK CORPORATION, Tokyo (JP)

(72) Inventors: Hitoshi Saita, Tokyo (JP); Hiroyasu Inoue, Tokyo (JP); Yoshihiko Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 47 days.

(21) Appl. No.: 15/006,366

(22) Filed: Jan. 26, 2016

(65) Prior Publication Data
US 2016/0217931 A1 Jul. 28, 2016

(30) Foreign Application Priority Data

Jan. 26, 2015 (JP) ................................. 2015-012178

(51) Int. Cl.
*H01G 4/06* (2006.01)
*C04B 35/00* (2006.01)
*H01G 4/12* (2006.01)
*H01G 4/33* (2006.01)
*H01G 4/10* (2006.01)

(52) U.S. Cl.
CPC ............. *H01G 4/33* (2013.01); *H01G 4/1227* (2013.01); *H01G 4/1236* (2013.01)

(58) Field of Classification Search
CPC ........ H01G 4/30; H01G 4/008; H01G 4/1227; H01G 4/33; H01G 4/10
USPC ......... 361/321.1, 321.5, 321.4; 501/134–136
See application file for complete search history.

(56) References Cited

U.S. PATENT DOCUMENTS

| | | |
|---|---|---|
| 2004/0178436 A1 | 9/2004 | Baniecki et al. |
| 2008/0257588 A1 | 10/2008 | Abe et al. |
| 2010/0265632 A1 | 10/2010 | Saita et al. |
| 2012/0147524 A1 | 6/2012 | Okamoto et al. |
| 2013/0094120 A1 | 4/2013 | Sasajima et al. |
| 2014/0212576 A1 | 7/2014 | Fujii et al. |

FOREIGN PATENT DOCUMENTS

| | | |
|---|---|---|
| JP | 2002-124712 A | 4/2002 |
| JP | 2004-281446 A | 10/2004 |
| JP | 2006-196848 A | 7/2006 |
| JP | 2010-267953 A | 11/2010 |
| JP | 2011-228462 A | 11/2011 |
| JP | 2014-144881 A | 8/2014 |
| WO | 2011/027625 A1 | 3/2011 |

*Primary Examiner* — Eric Thomas
*Assistant Examiner* — Arun Ramaswamy
(74) *Attorney, Agent, or Firm* — Oliff PLC

(57) ABSTRACT

A thin film capacitor comprises a base material, a dielectric layer provided on the base material, and an upper electrode layer provided on the dielectric layer. The dielectric layer includes a plurality of columnar crystals that extend along a normal direction with respect to a surface of the upper electrode layer, the columnar crystal has a perovskite crystal structure represented by $A_yBO_3$, an element A is at least one of Ba, Ca, Sr, and Pb, an element B is at least one of Ti, Zr, Sn, and Hf, $y \leq 0.995$ is satisfied, and the dielectric layer contains 0.05 to 2.5 mol of Al per 100 mol of $A_yBO_3$.

6 Claims, 4 Drawing Sheets

THIN FILM CAPACITOR

TECHNICAL FIELD

The present invention relates to a thin film capacitor.

BACKGROUND

An allowable mounting space for an electronic component in an electronic device tends to be reduced with downsizing of the electronic device. A capacitor (frequently referred to as a "condenser" in Japan), which is an electronic component installed in the plurality of electronic devices, is also required to be reduced in size or thinned. Since a thin film capacitor is thinner in a base material on which a dielectric body is formed, a dielectric layer, or an insulating film as compared with a laminated ceramic capacitor fabricated by the thick-film processing of related art, further thinning and lowering in profile are possible. Therefore, the thin film capacitor has been expected as an electronic component to be mounted on a low-profile and small space. Further, a capacitor such as those embedded in an electronic component substrate has been recently developed. In addition, development of the laminated ceramic capacitor of related art also has been advanced (see Japanese Unexamined Patent Publication No. 2004-281446, Japanese Unexamined Patent Publication No. 2011-228462, Japanese Unexamined Patent Publication No. 2006-196848, Japanese Unexamined Patent Publication No. 2002-124712, Japanese Unexamined Patent Publication No. 2010-267953, WO2011/027625, and Japanese Unexamined Patent Publication No. 2014-144881).

SUMMARY

There have been in the past many thin film capacitors having a capacitance smaller than an existing laminated ceramic capacitor. For this reason, for the thin film capacitor, there have been tried methods for improving the capacitance such as a method in which a film thickness of the dielectric layer is made thin as much as around 300 nm or 150 nm (see Japanese Unexamined Patent Publication No. 2004-281446 and Japanese Unexamined Patent Publication No. 2011-228462), or a method in which a fine structure of the dielectric layer of the thin film capacitor is made into not a granular structure but a columnar structure to improve ferroelectricity (see Japanese Unexamined Patent Publication No. 2006-196848, Japanese Unexamined Patent Publication No. 2002-124712, and Japanese Unexamined Patent Publication No. 2010-267953).

Here, the "granular structure" refers to a fine structure in which each of crystal grains of a substance constituting the dielectric layer has a spherical shape, and the respective crystal grains are densely piled. On the other hand, the "columnar structure" refers to a structure in which each of crystal grains constituting the dielectric layer has a column-like or needle-like shape instead of the spherical shape described above, and these grains are densely arranged and piled. In this columnar structure the crystal grains grown into a columnar shape are extending along with a direction of the film thickness of the dielectric layer.

Additionally, in the existing laminated ceramic capacitor, reduction in the capacitance owing to DC bias application has been suppressed by containing, in barium titanate that is a dielectric material, at least one kind or more selected from Fe, Co, Ni, Cu, and Zn in addition to Al (see WO2011/027625).

Moreover, insulation resistance of the thin film capacitor has been improved by doping Al to a dielectric thin film of barium strontium titanate type to reduce leak current characteristics of the thin film capacitor (see Japanese Unexamined Patent Publication No. 2014-144881).

Further, in a dielectric layer having a perovskite crystal structure represented by a formula of a crystal structure $A_yBO_3$ (A: A site element, B: B site element, O: oxygen, y: ratio of A site element/B site element), biased humidity reliability of the capacitor has been improved by defining $0.97 \leq y < 1.00$ (see Japanese Unexamined Patent Publication No. 2010-267953).

Study on capacitance improvement, insulation resistance improvement, and biased humidity reliability enhancement of the thin film capacitor has been made, but, as the dielectric layer of the thin film capacitor having the columnar structure becomes thinned, it has been difficult to suppress the reduction in the capacitance owing to DC bias application while maintaining the capacitance, the insulation resistance, and the biased humidity reliability.

Then, an object of the present invention is to provide a thin film capacitor having a fine structure called the columnar structure in a dielectric layer of the perovskite crystal structure of $A_yBO_3$ ($y \leq 0.995$), in which the reduction in the capacitance owing to DC bias application is suppressed.

The above problem is solved by a thin film capacitor comprising a base material, a dielectric layer provided on the base material, and an upper electrode layer provided on the dielectric layer, in which the dielectric layer includes a plurality of columnar crystals that extend along a normal direction with respect to an surface of the upper electrode layer, the columnar crystal has a perovskite crystal structure represented by $A_yBO_3$, an element A is at least one of Ba, Ca, Sr, and Pb, an element B is at least one of Ti, Zr, Sn, and Hf, $y \leq 0.995$ is satisfied, and the dielectric layer contains 0.05 to 2.5 mol of Al per 100 mol of $A_yBO_3$. If $y \leq 0.995$ holds, the A site element which is excess and does not react to the B site element is not generated in the film. If the excess A site element exists in the film, it reacts to oxygen and carbon dioxide in the air to generate carbonate derived from the A site element in the film. Carbonate has water absorbability, and thus, is considered to have adverse effects on the biased humidity reliability. Therefore, if $y \leq 0.995$ holds, the excess A site element is prevented from generating to improve the biased humidity reliability. Moreover, if $y < 0.97$ holds, insulation resistance of the dielectric layer tends to decrease. For this reason, if $0.97 \leq y \leq 0.995$ holds, the biased humidity reliability is improved and the insulation resistance is further improved at the same time.

The A site element and the B site element are selected from a viewpoint that $A_yBO_3$ may form the perovskite crystal structure and its dielectric constant becomes high. Additionally, in the dielectric layer of the perovskite crystal structure represented by $A_yBO_3$ with $y \leq 0.995$ made of the columnar crystals whose elements are selected as described above, containing 0.05 mol or more of Al per 100 mol of $A_yBO_3$ allows DC bias dependence of the capacitance to be suppressed even in the columnar structure having large capacitance. This was considered because containing Al in a proper amount weakens ferroelectricity of the perovskite crystal structure of the dielectric layer, suppressing the DC bias dependence of the capacitance. Further, it can be considered that containing Al in a proper amount promotes a structure that the dielectric layer has a dense fine structure, that is, the columnar structure, suppressing the reduction in the capacitance. However, if the Al content is large, the dielectric constant of the dielectric layer may be reduced. Therefore, the Al content is required to be 2.5 mol or less.

Further, the dielectric layer may contain 0.05 to 0.45 mol of Mn per 100 mol of $A_yBO_3$. In addition, at least one of V, Nb, and Ta may be contained in an amount of 0.05 to 0.5 mol in total. Moreover, at least one of rare-earth elements may be contained in an amount of 0.05 to 0.3 mol in total. The rare earth element can be particularly at least one or more selected from Y, Nd, Pm, Sm, Eu, Gd, Tb, Dy, Ho, Er, Tm and Yb. These elements may be contained together with Al, which may improve also the insulation resistance and the biased humidity reliability at the same time to further enhance the effect of the invention. Moreover, if y<0.97 holds, the insulation resistance of the dielectric layer tends to reduce. For this reason, if $0.97 \leq y \leq 0.995$ holds, the biased humidity reliability is improved and the insulation resistance is further improved at the same time.

Moreover, a metal foil containing 50 wt % or more of Ni as a principal component is used as the base material, facilitating thinning of the thin film capacitor in thickness. Since coefficients of thermal expansion of the dielectric layer formed on the base material and the metal foil containing Ni are similar values, a stress applied from the base material to the dielectric layer can be relaxed to suppress the reduction in the capacitance. In addition, it can be considered that a failure between the base material and the dielectric layer such as separation or crack caused by temperature shock and the like may be decreased.

By containing Al in the dielectric layer having the columnar structure, the reduction in the capacitance owing to DC bias application can be suppressed as compared with a dielectric layer which has the columnar structure not containing Al.

DETAILED DESCRIPTION

Hereinafter, a description is given of preferred embodiments of the present invention with reference to the drawings. However, the invention is not limited to the following embodiments, and each following embodiment shows an example of aspects belonging to a technical scope of the invention. Note that the same or similar components are designated by the same reference sign in each drawing and the duplicated description thereof is omitted.

Figure 1:
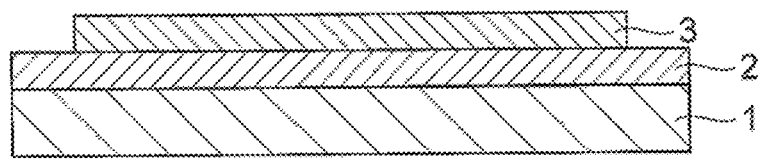
FIG. 1 is a schematic cross-sectional view of a thin film capacitor according to an embodiment of the invention.
Figure 2:
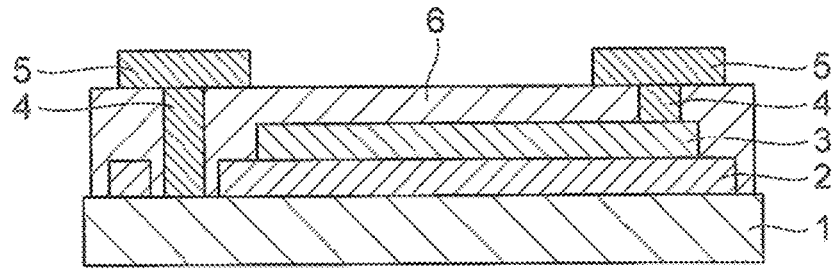
FIG. 2 is a schematic cross-sectional view of a thin film capacitor according to another embodiment of the invention.

A cross-sectional structural view of a thin film capacitor according to the embodiment is shown in FIG. 1 and FIG. 2. A base material 1 supporting a dielectric layer 2 may have an electrode layer on a surface. The thickness of the electrode layer can be between 0.01 and 100 μm. This base material can be those formed in such a way that a thermal oxide film of $SiO_2$ or the like is formed on a Si substrate, subsequently a nitride or oxide layer of $TiO_2$, TiN or the like, or a conductive oxide layer of $LaNiO_3$ or the like is formed thereon, and thereafter, an electrode layer made of noble metal such as Au, Ag, Pt, Pd, Rh, Ir, Ru, and Os, or metal such as Ni and Cu, or an alloy which contains Ni as a principal component, or a composite structure which contains various metals is formed. Moreover, the base material may be formed by using a ceramic substrate of $Al_2O_3$ or the like in place of the Si substrate and forming the electrode layer thereon. Further, the electrode layer may be made of not metal but a conductive oxide, for example, so long as it is a conductive layer. Still further, the electrode layer may have a structure in which two or more layers of the metal or alloy described above are laminated.

A method for forming the electrode layer described above may be, for example, a method using a chemical solution such as a SolGel method, and a MOD (Metal Organic Decomposition) method, a gas phase method such as MOCVD method, a CVD method, sputtering and a PLD (Pulse Laser Deposition) method, or an evaporation method.

Further, the base material 1 may be a metal foil. It is preferable the metal foil is a metal foil containing 50 wt % or more of Ni as a principal component. In the case of using the metal foil, it is advantageous that the thin film capacitor can be thinned, or that since a coefficient of thermal expansion of the metal foil has a value near that of the dielectric layer 2 formed on the base material 1, a stress applied from the base material 1 to the dielectric layer 2 can be relaxed to suppress reduction in the capacitance. In addition, it can be considered that a failure between the base material 1 and the dielectric layer 2 such as separation or crack caused by temperature shock and the like may be decreased.

The dielectric layer 2 may be those having a perovskite crystal structure represented by a formula of a crystal structure $A_yBO_3$ (A: A site element, B: B site element, O: oxygen, y: ratio of A site element/B site element). It is preferable that $y \leq 0.995$ holds in order to achieve biased humidity reliability. A columnar structure can exist all over the dielectric layer 2.

The A site element may be those containing at least one of Ba, Ca, Sr and Pb. The B site element may be those containing at least one of Ti, Zr, Sn and Hf. In order to decrease the reduction in the capacitance owing to DC bias application to the thin film capacitor, the dielectric layer 2 may contain 0.05 mol to 2.5 mol of Al per 100 mol of $A_yBO_3$. Moreover, 0.05 to 0.45 mol of Mn may be contained per 100 mol of $A_yBO_3$. Further, 0.05 to 0.5 mol in total of at least one of V, Nb and Ta which are pentavalent metal may be contained. Additionally, 0.05 to 0.3 mol of a rare-earth element may be contained. The rare earth element may be particularly at least one or more selected from Y, Nd, Pm, Sm, Eu, Gd, Tb, Dy, Ho, Er, Tm and Yb. By containing these elements, the thin film capacitor can be obtained of improved insulation resistance, good biased humidity reliability, and low reduction in the capacitance owing to DC bias application.

A method for forming the dielectric layer 2 may be a general method for manufacturing a thin film, for example, a method using a chemical solution such as a SolGel method, a MOD (Metal Organic Decomposition) method, a gas phase method such as a MOCVD method, a CVD method, sputtering and a PLD (Pulse Laser Deposition) method, or an evaporation method.

It is preferable that a film thickness of the dielectric layer 2 is 100 nm to 1000 nm. This is because if the thickness is thinner than 100 nm, in a case where DC bias is applied to the thin film capacitor, an excessive electric field intensity may be applied to deteriorate the insulation resistance so that a function as a capacitor is not possibly exerted. On the other hand, as a reason for the above, if the thickness exceeds 1000 nm, the capacitance of the capacitor per unit area is reduced to make it difficult to manufacture a capacitor of high capacitance.

An upper electrode layer 3 may use the electrode layer used for the base material 1 or the same type as the base material 1 itself; and Ni, Cu or the like is preferable. In addition, Al which is large in electric conductivity may be used. Moreover, the noble metal such as Au, Ag, Pt, Pd, Rh, Ir, Ru and Os may be used. Further, alloy or composite including the above metal may be used. Still further, the upper electrode layer 3 may be a laminated body of two or more layers including the above metal, alloy, or composite. Yet further, as for a method for forming the upper electrode layer 3, a method of the same type as the method for forming the dielectric layer 2 may be used.

In a case where the thin film capacitor is formed into an element, a need to form an insulating layer 6 covering a capacitor part of the element is brought about. This insulating layer 6 may preferably use, for example, insulating resin such as a polyimide type resin, an epoxy type resin, a phenol type resin, a benzocyclobutene type resin, a polyamide type resin and a fluoropolymer type resin. Additionally, an inorganic material such as $SiO_2$ may be used.

Moreover, in the case where the thin film capacitor is formed into an element, as shown in FIG. 2, a need to form extraction electrodes 4 is brought about for extracting electrodes from the base material 1 side and from the upper electrode layer 3 side. These extraction electrodes 4 can be fabricated by means of sputtering, plating or the like and metal of the same type as the upper electrode layer 3 may be used as materials thereof. Futher, terminal electrodes 5 need to be formed, and these terminal electrodes 5 can be fabricated by means of plating or the like and metal of the same type as the upper electrode layer 3 may be used as metal used therefor. Still further, in order to improve contact between the insulating layer 6 and the terminal electrode 5 or the extraction electrode 4, a contact layer made of Ti, Cr or the like may be formed between the insulating layer 6 and the extraction electrode 4 and between the insulating layer 6 and the terminal electrode 5.

Hereinafter, a description is given in more detail of the invention through Examples and Comparative example. However, the invention is not limited to Examples and Comparative examples below.

EXAMPLES, COMPARATIVE EXAMPLES

Figure 3:
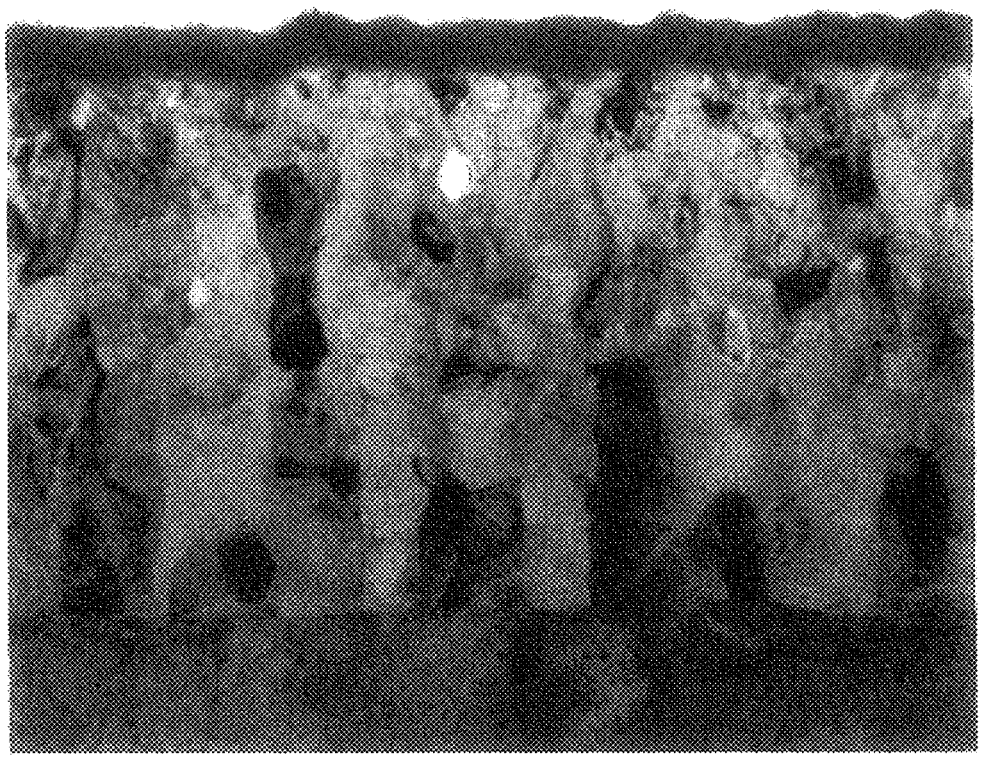
FIG. 3 is a transmission electron microscope image (TEM image) of a cross-section of a thin film capacitor according to an embodiment of the invention (Example 43)

A Ni foil substrate of 100×100 mm was prepared. The Ni foil whose surface was polished was used because the dielectric layer was formed thereon. The dielectric layer was formed on the polished surface side of the Ni foil by means of a solution technique. As a material solution, a butanol solution was used in which barium octylate, strontium octylate, calcium octylate, titanium octylate, zirconium octylate, aluminum octylate, manganese octylate, vanadium octylate, niobium octylate, tantalum octylate, and yttrium octylate were solved. Respective material solutions were weighed and prepared to obtain compositions in Table 1 to Table 4. The concentration of the prepared solution was adjusted to be 0.6 mol/kg in terms of Ti content by adding the butanol solution. The prepared solution was coated on the Ni foil surface by spin coating. After coating, a solvent in the applied film was dried and removed at 150° C., and was heated in an air atmosphere at 400° C. for 10 minutes to decompose the octylic acid. After that, the resultant was heated in vacuum ($10^{-3}$ to $10^{-4}$ Pa) at 900° C. for 30 minutes to crystallize the applied film. A crystallized dielectric layer was formed, followed by application of the prepared solution again by spin coating to be subjected to the above series of operations until the crystallization. This series of operations from the solution application until the crystallization was repeated 15 times, that is, repeated until a target dielectric layer thickness was obtained. Through this process, the decomposition and crystallization of the solution was promoted with respect to a layer applied on each of 15 layers so as to promote columnar crystallization. The resultant film thickness was 800 nm. Compositional analysis of the film using fluorescent X-rays was performed to confirm that the composition of the crystallized film is the same as the feed composition of each of the solutions in Table 1 to Table 4. Further, a cross-sectional structure of the dielectric layer was observed using a scanning electron microscope (SEM) and a transmission electron microscope (TEM). As a result of the observation, all samples in Table 1 to Table 4 were confirmed to be the dielectric layer having the columnar structure. As an example, a TEM image of a cross-sectional structure of a dielectric layer in Example 43 is shown in FIG. 3.

Next, an upper electrode layer was formed by sputtering Ni of 500 nm and Cu of 2000 nm on the dielectric layer. Next, in order to fabricate a chip-type capacitor element having a size of length 1 mm×width 0.5 mm (1005 element), the upper electrode layer and the dielectric layer were patterned, and thereafter, an insulating layer was formed of polyimide resin. In forming the insulating layer, in order to form extraction electrodes from the Ni foil side and the upper electrode layer side, via holes were formed in the insulating layer by photolithography.

Next, on the insulating layer in which the via holes were formed, a Ti layer of 20 nm was formed by sputtering, and subsequently a Cu layer of 500 nm was formed. Cu plating was performed with the Ti layer and the Cu layer being used as a seed electrode layer to fabricate the extraction electrodes in the via holes and then terminal electrodes having a predetermined shape. A thickness of the terminal electrode was 10 μm. After that, the seed electrode layer was removed except for portions of the terminal electrodes to fabricate a thin film capacitor of 1005 element. On the Ni foil of 100×100 mm 8000 capacitors were formed. After that, a single body of the 1005 element was fabricated by dicing.

The capacitance at no DC loading and insulation resistance of the finished 1005 element were measured in such a manner that 10 samples were measured per one measurement. The capacitance was measured using an LCR meter 4284A manufactured by Agilent Co. at 1 kHz, 1 Vrms, and a room temperature. The insulation resistance was measured using a high-resistance meter 4339B manufactured by Agilent Co. at DC 4V and a room temperature. Results of an average of the measured values of several tens of samples are shown in Table 5 to Table 8.

Next, the capacitance at DC bias application was evaluated. The number of samples per one measurement was ten for each composition. A change rate of the capacitance by DC 5V application relative to the capacitance at no DC loading was obtained. An average of values of several tens of samples is shown in Table 5 to Table 8.

Next, biased humidity reliability characteristic of the sample for each composition was evaluated. The number of the evaluated samples for each composition was 20, and the samples were tested at DC 4 V, 60° C., and 95% RH for 2000 hours. The insulation resistances of the samples before and after the test were measured at DC 4V, and those of the samples not reduced in the insulation resistance to 1/50 of that before the test were determined as good products. A ratio of the samples determined as a good product even after the test is shown in Table 5 to Table 8.

In a case of Al content in a range of 0.05 to 2.5 mol %, the reduction in the capacitance in DC bias application was −40% or less, showing a good result (Examples 1 to 15, Examples 16 to 30, Examples 31 to 45, Examples 46 to 60, and Examples 61 to 64). It was found that a case where the Al content is less than 0.05 mol % has a problem in that the reduction in the capacitance owing to DC bias application exceeds 40% and the capacitance of the capacitor would be remarkably reduced if DC bias is applied (Comparative example 1, Comparative example 4, Comparative example 7, Comparative example 8, Comparative examples 10 to 11, Comparative examples 13 to 14, Comparative examples 16 to 17, and Comparative example 19). Moreover, it was found that in a case where the Al content exceeds 2.5 mol %, the capacitance of the capacitor falls below 2 nF and the biased humidity reliability is not kept at all (Comparative example 9, Comparative example 12, Comparative example 15, Comparative example 18, and Comparative example 20).

Further, it was found that in a case where Mn, the pentavalent metals V, Nb and Ta, and Y as one of the rare-earth elements are contained together with Al at the same time, a remarkable effect is given to the insulation resistance and biased humidity reliability of the capacitor, and the capacitor in which DC bias dependence of the capacitance is low can be obtained. As for content, it was found that Mn content, total content of the pentavalent metals V, Nb and Ta, and Y content as one of the rare-earth elements may be respectively 0.05 to 0.45 mol %, 0.05 to 0.5 mol %, and 0.05 to 0.3 mol % (Examples 1 to 6, Examples 13 to 15, Examples 16 to 21, Examples 28 to 30, Examples 31 to 36, Examples 43 to 45, Examples 46 to 51, Examples 58 to 60, Examples 61 to 64). In a case of the contents out of the above range, the reduction in the insulation resistance was remarkable, the biased humidity reliability characteristic was deteriorated, or the capacitance was reduced.

Further, if y that is the ratio of A site element /B site element is 0.995 or less, the biased humidity reliability characteristic is also improved. Therefore, y is required to be 0.995 or less. It was found that if y is 1 or more, the biased humidity reliability is not kept at all (Comparative examples 1 to 6). In addition, if y is 0.96 or less, the insulation resistance is slightly reduced. For this reason, it is preferable that $0.97 \leq y \leq 0.995$ holds. The amounts of Al, Mn, V, Nb, Ta and Y in tables 1 to 4 and 9 are "mol %" relative to 1 mol of $(Ba_{1-a-b}Sr_aCa_b)_yTi_{1-c}Zr_cO_3$.

TABLE 1

| | | $(Ba_{1-a-b}Sr_aCa_b)_yTi_{1-c}Zr_cO_3$ | | | | Al | MN | V | Nb | Ta | Y |
|---|---|---|---|---|---|---|---|---|---|---|---|
| | | a | b | y | c | | | (mol %) | | | |
| 1 | Comparative example 1 | 0 | 0 | 1.01 | 0 | 0 | 0.2 | 0.2 | 0 | 0 | 0.1 |
| 2 | Comparative example 2 | 0 | 0 | 1.01 | 0 | 1 | 0.2 | 0.2 | 0 | 0 | 0.1 |
| 3 | Comparative example 3 | 0 | 0 | 1.01 | 0 | 2 | 0.2 | 0.2 | 0 | 0 | 0.1 |
| 4 | Comparative example 4 | 0 | 0 | 1 | 0 | 0 | 0.2 | 0.2 | 0 | 0 | 0.1 |
| 5 | Comparative example 5 | 0 | 0 | 1 | 0 | 1 | 0.2 | 0.2 | 0 | 0 | 0.1 |
| 6 | Comparative example 6 | 0 | 0 | 1 | 0 | 2 | 0.2 | 0.2 | 0 | 0 | 0.1 |
| 7 | Comparative example 7 | 0 | 0 | 0.995 | 0 | 0 | 0.2 | 0.2 | 0 | 0 | 0.1 |
| 8 | Comparative example 8 | 0 | 0 | 0.995 | 0 | 0.03 | 0.2 | 0.2 | 0 | 0 | 0.1 |
| 9 | Example 1 | 0.03 | 0 | 0.995 | 0 | 0.05 | 0.45 | 0.05 | 0 | 0 | 0.1 |
| 10 | Example 2 | 0 | 0.03 | 0.995 | 0 | 1.5 | 0.2 | 0.1 | 0.1 | 0 | 0.2 |
| 11 | Example 3 | 0 | 0 | 0.995 | 0.01 | 1 | 0.05 | 0.5 | 0 | 0 | 0.25 |
| 12 | Example 4 | 0 | 0 | 0.995 | 0.01 | 1.5 | 0.2 | 0.1 | 0 | 0 | 0.3 |
| 13 | Example 5 | 0 | 0 | 0.995 | 0 | 0.5 | 0.5 | 0 | 0.05 | 0.05 | 0.1 |
| 14 | Example 6 | 0 | 0 | 0.995 | 0 | 1.5 | 0.2 | 0.3 | 0.1 | 0.1 | 0.1 |
| 15 | Example 7 | 0.03 | 0 | 0.995 | 0 | 0.5 | 0.2 | 0.1 | 0 | 0.1 | 0 |
| 16 | Example 8 | 0 | 0 | 0.995 | 0 | 0.2 | 0 | 0 | 0 | 0 | 0 |
| 17 | Example 9 | 0 | 0 | 0.995 | 0 | 0.3 | 0.2 | 0 | 0 | 0 | 0 |
| 18 | Example 10 | 0 | 0 | 0.995 | 0 | 0.5 | 0.2 | 0 | 0 | 0 | 0.1 |
| 19 | Example 11 | 0 | 0 | 0.995 | 0 | 0.5 | 0 | 0.2 | 0 | 0 | 0 |
| 20 | Example 12 | 0 | 0 | 0.995 | 0 | 0.5 | 0 | 0.2 | 0 | 0 | 0.1 |
| 21 | Example 13 | 0 | 0 | 0.995 | 0 | 1 | 0.2 | 0.2 | 0 | 0 | 0.05 |
| 22 | Example 14 | 0 | 0 | 0.995 | 0 | 2 | 0.2 | 0.2 | 0 | 0 | 0.1 |
| 23 | Example 15 | 0 | 0 | 0.995 | 0 | 2.5 | 0.2 | 0.2 | 0 | 0 | 0.1 |
| 24 | Comparative example 9 | 0 | 0 | 0.995 | 0 | 3 | 0.2 | 0.2 | 0 | 0 | 0.1 |

TABLE 2

| | | $(Ba_{1-a-b}Sr_aCa_b)_yTi_{1-c}Zr_cO_3$ | | | | Al | Mn | V | Nb | Ta | Y |
|---|---|---|---|---|---|---|---|---|---|---|---|
| | | a | b | y | c | (mol %) | | | | | |
| 25 | Comparative example 10 | 0 | 0 | 0.99 | 0 | 0 | 0.2 | 0.2 | 0 | 0 | 0.1 |
| 26 | Comparative example 11 | 0 | 0 | 0.99 | 0 | 0.03 | 0.2 | 0.2 | 0 | 0 | 0.1 |
| 27 | Example 16 | 0.03 | 0 | 0.99 | 0 | 0.05 | 0.45 | 0.05 | 0 | 0 | 0.1 |
| 28 | Example 17 | 0 | 0.03 | 0.99 | 0 | 1.5 | 0.2 | 0.1 | 0.1 | 0 | 0.2 |
| 29 | Example 18 | 0 | 0 | 0.99 | 0.01 | 1 | 0.05 | 0.5 | 0 | 0 | 0.25 |
| 30 | Example 19 | 0 | 0 | 0.99 | 0.01 | 1.5 | 0.2 | 0.1 | 0 | 0 | 0.3 |
| 31 | Example 20 | 0 | 0 | 0.99 | 0 | 0.5 | 0.5 | 0 | 0.05 | 0.05 | 0.1 |
| 32 | Example 21 | 0 | 0 | 0.99 | 0 | 1.5 | 0.2 | 0.3 | 0.1 | 0.1 | 0.1 |
| 33 | Example 22 | 0.03 | 0 | 0.99 | 0 | 0.5 | 0.2 | 0.1 | 0 | 0.1 | 0 |
| 34 | Example 23 | 0 | 0 | 0.99 | 0 | 0.2 | 0 | 0 | 0 | 0 | 0 |
| 35 | Example 24 | 0 | 0 | 0.99 | 0 | 0.3 | 0.2 | 0 | 0 | 0 | 0 |
| 36 | Example 25 | 0 | 0 | 0.99 | 0 | 0.5 | 0.2 | 0 | 0 | 0 | 0.1 |
| 37 | Example 26 | 0 | 0 | 0.99 | 0 | 0.5 | 0 | 0.2 | 0 | 0 | 0 |
| 38 | Example 27 | 0 | 0 | 0.99 | 0 | 0.5 | 0 | 0.2 | 0 | 0 | 0.1 |
| 39 | Example 28 | 0 | 0 | 0.99 | 0 | 1 | 0.2 | 0.2 | 0 | 0 | 0.05 |
| 40 | Example 29 | 0 | 0 | 0.99 | 0 | 2 | 0.2 | 0.2 | 0 | 0 | 0.1 |
| 41 | Example 30 | 0 | 0 | 0.99 | 0 | 2.5 | 0.2 | 0.2 | 0 | 0 | 0.1 |
| 42 | Comparative example 12 | 0 | 0 | 0.99 | 0 | 3 | 0.2 | 0.2 | 0 | 0 | 0.1 |

TABLE 3

| | | $(Ba_{1-a-b}Sr_aCa_b)_yTi_{1-c}Zr_cO_3$ | | | | Al | Mn | V | Nb | Ta | Y |
|---|---|---|---|---|---|---|---|---|---|---|---|
| | | a | b | y | c | (mol %) | | | | | |
| 43 | Comparative example 13 | 0 | 0 | 0.98 | 0 | 0 | 0.2 | 0.2 | 0 | 0 | 0.1 |
| 44 | Comparative example 14 | 0 | 0 | 0.98 | 0 | 0.03 | 0.2 | 0.2 | 0 | 0 | 0.1 |
| 45 | Example 31 | 0.03 | 0 | 0.98 | 0 | 0.05 | 0.45 | 0.05 | 0 | 0 | 0.1 |
| 46 | Example 32 | 0 | 0.03 | 0.98 | 0 | 1.5 | 0.2 | 0.1 | 0.1 | 0 | 0.2 |
| 47 | Example 33 | 0 | 0 | 0.98 | 0.01 | 1 | 0.05 | 0.5 | 0 | 0 | 0.25 |
| 48 | Example 34 | 0 | 0 | 0.98 | 0.01 | 1.5 | 0.2 | 0.1 | 0 | 0 | 0.3 |
| 49 | Example 35 | 0 | 0 | 0.98 | 0 | 0.5 | 0.5 | 0 | 0.05 | 0.05 | 0.1 |
| 50 | Example 36 | 0 | 0 | 0.98 | 0 | 1.5 | 0.2 | 0.3 | 0.1 | 0.1 | 0.1 |
| 51 | Example 37 | 0.03 | 0 | 0.98 | 0 | 0.5 | 0.2 | 0.1 | 0 | 0.1 | 0 |
| 52 | Example 38 | 0 | 0 | 0.98 | 0 | 0.2 | 0 | 0 | 0 | 0 | 0 |
| 53 | Example 39 | 0 | 0 | 0.98 | 0 | 0.3 | 0.2 | 0 | 0 | 0 | 0 |
| 54 | Example 40 | 0 | 0 | 0.98 | 0 | 0.5 | 0.2 | 0 | 0 | 0 | 0.1 |
| 55 | Example 41 | 0 | 0 | 0.98 | 0 | 0.5 | 0 | 0.2 | 0 | 0 | 0 |
| 56 | Example 42 | 0 | 0 | 0.98 | 0 | 0.5 | 0 | 0.2 | 0 | 0 | 0.1 |
| 57 | Example 43 | 0 | 0 | 0.98 | 0 | 1 | 0.2 | 0.2 | 0 | 0 | 0.05 |
| 58 | Example 44 | 0 | 0 | 0.98 | 0 | 2 | 0.2 | 0.2 | 0 | 0 | 0.1 |
| 59 | Example 45 | 0 | 0 | 0.98 | 0 | 2.5 | 0.2 | 0.2 | 0 | 0 | 0.1 |
| 60 | Comparative example 15 | 0 | 0 | 0.98 | 0 | 3 | 0.2 | 0.2 | 0 | 0 | 0.1 |

TABLE 4

| | | $(Ba_{1-a-b}Sr_aCa_b)_yTi_{1-c}Zr_cO_3$ | | | | Al | Mn | V | Nb | Ta | Y |
|---|---|---|---|---|---|---|---|---|---|---|---|
| | | a | b | y | c | (mol %) | | | | | |
| 61 | Comparative example 16 | 0 | 0 | 0.97 | 0 | 0 | 0.2 | 0.2 | 0 | 0 | 0.1 |
| 62 | Comparative example 17 | 0 | 0 | 0.97 | 0 | 0.03 | 0.2 | 0.2 | 0 | 0 | 0.1 |
| 63 | Example 46 | 0.03 | 0 | 0.97 | 0 | 0.05 | 0.45 | 0.05 | 0 | 0 | 0.1 |
| 64 | Example 47 | 0 | 0.03 | 0.97 | 0 | 1.5 | 0.2 | 0.1 | 0.1 | 0 | 0.2 |
| 65 | Example 48 | 0 | 0 | 0.97 | 0.01 | 1 | 0.05 | 0.5 | 0 | 0 | 0.25 |
| 66 | Example 49 | 0 | 0 | 0.97 | 0.01 | 1.5 | 0.2 | 0.1 | 0 | 0 | 0.3 |
| 67 | Example 50 | 0 | 0 | 0.97 | 0 | 0.5 | 0.5 | 0 | 0.05 | 0.05 | 0.1 |
| 68 | Example 51 | 0 | 0 | 0.97 | 0 | 1.5 | 0.2 | 0.3 | 0.1 | 0.1 | 0.1 |
| 69 | Example 52 | 0.03 | 0 | 0.97 | 0 | 0.5 | 0.2 | 0.1 | 0 | 0.1 | 0 |
| 70 | Example 53 | 0 | 0 | 0.97 | 0 | 0.2 | 0 | 0 | 0 | 0 | 0 |
| 71 | Example 54 | 0 | 0 | 0.97 | 0 | 0.3 | 0.2 | 0 | 0 | 0 | 0 |
| 72 | Example 55 | 0 | 0 | 0.97 | 0 | 0.5 | 0.2 | 0 | 0 | 0 | 0.1 |
| 73 | Example 56 | 0 | 0 | 0.97 | 0 | 0.5 | 0 | 0.2 | 0 | 0 | 0 |

TABLE 4-continued

| | | $(Ba_{1-a-b}Sr_aCa_b)_yTi_{1-c}Zr_cO_3$ | | | | Al | Mn | V | Nb | Ta | Y |
|---|---|---|---|---|---|---|---|---|---|---|---|
| | | a | b | y | c | (mol %) | | | | | |
| 74 | Example 57 | 0 | 0 | 0.97 | 0 | 0.5 | 0 | 0.2 | 0 | 0 | 0.1 |
| 75 | Example 58 | 0 | 0 | 0.97 | 0 | 1 | 0.2 | 0.2 | 0 | 0 | 0.05 |
| 76 | Example 59 | 0 | 0 | 0.97 | 0 | 2 | 0.2 | 0.2 | 0 | 0 | 0.1 |
| 77 | Example 60 | 0 | 0 | 0.97 | 0 | 2.5 | 0.2 | 0.2 | 0 | 0 | 0.1 |
| 78 | Comparative example 18 | 0 | 0 | 0.97 | 0 | 3 | 0.2 | 0.2 | 0 | 0 | 0.1 |
| 79 | Comparative example 19 | 0 | 0 | 0.96 | 0 | 0 | 0.2 | 0.2 | 0 | 0 | 0.1 |
| 80 | Example 61 | 0 | 0 | 0.96 | 0 | 0.5 | 0.2 | 0.2 | 0 | 0 | 0.1 |
| 81 | Example 62 | 0 | 0 | 0.96 | 0 | 1 | 0.2 | 0.2 | 0 | 0 | 0.05 |
| 82 | Example 63 | 0 | 0 | 0.96 | 0 | 2 | 0.2 | 0.2 | 0 | 0 | 0.1 |
| 83 | Example 64 | 0 | 0 | 0.96 | 0 | 2.5 | 0.2 | 0.2 | 0 | 0 | 0.1 |
| 84 | Comparative example 20 | 0 | 0 | 0.96 | 0 | 3 | 0.2 | 0.2 | 0 | 0 | 0.1 |

TABLE 5

| | | Capacitance (nF) | Insulation resistance ($\Omega$) | Capacitance change rate by DC bias (%) | Biased humidity reliability Number conforming/Number input |
|---|---|---|---|---|---|
| 1 | Comparative example 1 | 4.04 | $3.8 \times 10^{10}$ | −51.00 | 0/20 |
| 2 | Comparative example 2 | 3.81 | $8.9 \times 10^{9}$ | −37.46 | 0/20 |
| 3 | Comparative example 3 | 2.80 | $2.3 \times 10^{8}$ | −35.13 | 0/20 |
| 4 | Comparative example 4 | 4.12 | $2.2 \times 10^{10}$ | −51.5 | 0/20 |
| 5 | Comparative example 5 | 3.85 | $9.8 \times 10^{9}$ | −33.39 | 0/20 |
| 6 | Comparative example 6 | 2.96 | $8.3 \times 10^{8}$ | −36.30 | 0/20 |
| 7 | Comparative example 7 | 4.20 | $3.1 \times 10^{10}$ | −52.35 | 20/20 |
| 8 | Comparative example 8 | 4.18 | $3.0 \times 10^{10}$ | −51.21 | 20/20 |
| 9 | Example 1 | 4.13 | $4.0 \times 10^{10}$ | −39.79 | 20/20 |
| 10 | Example 2 | 4.01 | $3.2 \times 10^{10}$ | −38.92 | 20/20 |
| 11 | Example 3 | 3.89 | $2.1 \times 10^{10}$ | −32.46 | 20/20 |
| 12 | Example 4 | 2.89 | $1.3 \times 10^{10}$ | −39.79 | 20/20 |
| 13 | Example 5 | 2.88 | $1.5 \times 10^{10}$ | −35.61 | 20/20 |
| 14 | Example 6 | 2.68 | $1.2 \times 10^{10}$ | −33.86 | 20/20 |
| 15 | Example 7 | 4.01 | $1.1 \times 10^{10}$ | −38.92 | 18/20 |
| 16 | Example 8 | 3.81 | $2.3 \times 10^{7}$ | −36.48 | 15/20 |
| 17 | Example 9 | 3.80 | $2.1 \times 10^{10}$ | −35.32 | 12/20 |
| 18 | Example 10 | 3.80 | $1.5 \times 10^{10}$ | −34.74 | 14/20 |
| 19 | Example 11 | 3.89 | $3.2 \times 10^{8}$ | −36.19 | 13/20 |
| 20 | Example 12 | 3.88 | $3.6 \times 10^{8}$ | −36.77 | 12/20 |
| 21 | Example 13 | 3.73 | $1.2 \times 10^{9}$ | −30.88 | 20/20 |
| 22 | Example 14 | 3.00 | $2.0 \times 10^{9}$ | −30.17 | 20/20 |
| 23 | Example 15 | 2.50 | $2.3 \times 10^{9}$ | −29.81 | 12/20 |
| 24 | Comparative example 9 | 1.80 | $2.0 \times 10^{9}$ | −27.91 | 0/20 |

TABLE 6

| | | Capacitance (nF) | Insulation resistance ($\Omega$) | Capacitance change rate by DC bias (%) | Biased humidity reliability Number conforming/Number input |
|---|---|---|---|---|---|
| 25 | Comparative example 10 | 4.22 | $3.0 \times 10^{10}$ | −58.83 | 20/20 |
| 26 | Comparative example 11 | 4.18 | $2.9 \times 10^{10}$ | −57.81 | 20/20 |
| 27 | Example 16 | 4.23 | $2.9 \times 10^{10}$ | −40.66 | 20/20 |
| 28 | Example 17 | 3.94 | $2.5 \times 10^{10}$ | −35.04 | 20/20 |
| 29 | Example 18 | 3.98 | $2.0 \times 10^{10}$ | −38.04 | 20/20 |
| 30 | Example 19 | 2.99 | $4.3 \times 10^{10}$ | −35.95 | 20/20 |
| 31 | Example 20 | 2.82 | $3.8 \times 10^{10}$ | −37.94 | 20/20 |
| 32 | Example 21 | 2.47 | $3.1 \times 10^{10}$ | −35.66 | 20/20 |
| 33 | Example 22 | 4.02 | $2.1 \times 10^{10}$ | −38.33 | 19/20 |
| 34 | Example 23 | 3.85 | $1.3 \times 10^{7}$ | −36.77 | 14/20 |
| 35 | Example 24 | 3.88 | $1.2 \times 10^{10}$ | −35.90 | 12/20 |
| 36 | Example 25 | 3.86 | $1.3 \times 10^{10}$ | −36.19 | 15/20 |
| 37 | Example 26 | 3.94 | $1.1 \times 10^{8}$ | −36.48 | 11/20 |
| 38 | Example 27 | 3.83 | $1.0 \times 10^{8}$ | −36.48 | 10/20 |
| 39 | Example 28 | 3.79 | $1.5 \times 10^{10}$ | −37.75 | 20/20 |
| 40 | Example 29 | 2.93 | $2.5 \times 10^{9}$ | −33.75 | 20/20 |
| 41 | Example 30 | 2.20 | $2.0 \times 10^{9}$ | −30.21 | 11/20 |
| 42 | Comparative example 12 | 1.63 | $1.5 \times 10^{9}$ | −29.50 | 0/20 |

TABLE 7

| | | Capacitance (nF) | Insulation resistance ($\Omega$) | Capacitance change rate by DC bias (%) | Biased humidity reliability Number conforming/Number input |
|---|---|---|---|---|---|
| 43 | Comparative example 13 | 4.17 | $2.8 \times 10^{10}$ | −57.48 | 20/20 |
| 44 | Comparative example 14 | 4.15 | $2.7 \times 10^{10}$ | −56.98 | 20/20 |
| 45 | Example 31 | 4.23 | $2.5 \times 10^{10}$ | −40.66 | 20/20 |
| 46 | Example 32 | 4.00 | $2.2 \times 10^{10}$ | −36.83 | 20/20 |
| 47 | Example 33 | 3.88 | $1.8 \times 10^{10}$ | −37.46 | 20/20 |
| 48 | Example 34 | 2.89 | $1.2 \times 10^{10}$ | −32.70 | 20/20 |
| 49 | Example 35 | 2.87 | $1.0 \times 10^{10}$ | −35.61 | 20/20 |
| 50 | Example 36 | 2.51 | $2.2 \times 10^{10}$ | −31.83 | 20/20 |
| 51 | Example 37 | 4.22 | $1.8 \times 10^{10}$ | −34.95 | 19/20 |
| 52 | Example 38 | 3.79 | $1.0 \times 10^{8}$ | −37.06 | 12/20 |
| 53 | Example 39 | 3.81 | $1.5 \times 10^{10}$ | −36.77 | 11/20 |
| 54 | Example 40 | 3.79 | $1.2 \times 10^{10}$ | −36.48 | 16/20 |
| 55 | Example 41 | 3.90 | $1.2 \times 10^{8}$ | −37.06 | 10/20 |
| 56 | Example 42 | 3.89 | $1.0 \times 10^{8}$ | −36.19 | 12/20 |
| 57 | Example 43 | 3.73 | $1.8 \times 10^{10}$ | −35.08 | 20/20 |
| 58 | Example 44 | 2.88 | $2.4 \times 10^{9}$ | −35.92 | 20/20 |

TABLE 7-continued

|    |                       | Capacitance (nF) | Insulation resistance (Ω) | Capacitance change rate by DC bias (%) | Biased humidity reliability Number conforming/ Number input |
|----|-----------------------|------------------|---------------------------|----------------------------------------|-------------------------------------------------------------|
| 59 | Example 45            | 2.20 | $1.8 \times 10^9$  | −32.31 | 11/20 |
| 60 | Comparative example 15 | 1.52 | $1.1 \times 10^9$  | −29.30 | 0/20  |

TABLE 8

|    |                       | Capacitance (nF) | Insulation resistance (Ω) | Capacitance change rate by DC bias (%) | Biased humidity reliability Number conforming/ Number input |
|----|-----------------------|------|---------------------|--------|-------|
| 61 | Comparative example 16 | 4.14 | $2.8 \times 10^{10}$ | −57.48 | 20/20 |
| 62 | Comparative example 17 | 4.12 | $2.7 \times 10^{10}$ | −56.98 | 20/20 |
| 63 | Example 46            | 4.16 | $2.2 \times 10^{10}$ | −41.83 | 20/20 |
| 64 | Example 47            | 4.02 | $2.0 \times 10^{10}$ | −38.13 | 20/20 |
| 65 | Example 48            | 3.82 | $1.5 \times 10^{10}$ | −39.66 | 20/20 |
| 66 | Example 49            | 2.99 | $2.8 \times 10^{10}$ | −33.86 | 20/20 |
| 67 | Example 50            | 2.82 | $1.8 \times 10^{10}$ | −36.77 | 20/20 |
| 68 | Example 51            | 2.62 | $1.3 \times 10^{10}$ | −34.74 | 20/20 |
| 69 | Example 52            | 4.13 | $1.0 \times 10^{10}$ | −38.04 | 19/20 |
| 70 | Example 53            | 3.77 | $2.1 \times 10^7$    | −37.17 | 15/20 |
| 71 | Example 54            | 3.77 | $2.1 \times 10^{10}$ | −37.56 | 13/20 |
| 72 | Example 55            | 3.75 | $1.5 \times 10^{10}$ | −37.06 | 18/20 |
| 73 | Example 56            | 3.82 | $1.2 \times 10^8$    | −37.35 | 12/20 |
| 74 | Example 57            | 3.73 | $1.5 \times 10^8$    | −37.94 | 10/20 |
| 75 | Example 58            | 3.66 | $1.5 \times 10^{10}$ | −35.11 | 20/20 |
| 76 | Example 59            | 2.89 | $1.4 \times 10^9$    | −34.98 | 20/20 |
| 77 | Example 60            | 2.21 | $1.3 \times 10^9$    | −30.11 | 10/20 |
| 78 | Comparative example 18 | 1.40 | $9.3 \times 10^8$   | −28.80 | 0/20  |
| 79 | Comparative example 19 | 4.10 | $3.0 \times 10^8$   | −63.51 | 20/20 |
| 80 | Example 61            | 4.13 | $2.3 \times 10^8$    | −38.83 | 20/20 |
| 81 | Example 62            | 4.11 | $1.2 \times 10^8$    | −35.66 | 20/20 |
| 82 | Example 63            | 3.10 | $1.0 \times 10^8$    | −30.20 | 17/20 |
| 83 | Example 64            | 2.21 | $8.8 \times 10^7$    | −29.87 | 11/20 |
| 84 | Comparative example 20 | 1.25 | $8.5 \times 10^7$   | −28.78 | 0/20  |

Figure 4:
FIG. 4 is a transmission electron microscope image (TEM image) of a cross-section of a thin film capacitor which does not belong to the embodiment of the invention (Comparative example 19).

Next, similarly, a Ni foil substrate of 100×100 mm was prepared. A surface of the Ni foil was polished because the dielectric layer was formed thereon. The dielectric layer of 800 nm was formed on the Ni foil whose surface was polished by means of a solution technique. As a material solution, a butanol solution was used in which barium octylate, titanium octylate, aluminum octylate, manganese octylate, vanadium octylate, and yttrium octylate were solved. Respective material solutions were weighed and prepared to obtain compositions in Table 9. The concentration of the prepared solution was adjusted to be 0.6 mol/kg in terms of Ti content by adding the butanol solution to the solvent. The prepared solution was coated on the Ni foil surface by spin coating. After coating, the solvent in the applied film was dried and removed at 150° C., and was heated in an air atmosphere at 400° C. for 10 minutes to decompose the octylic acid. Application of the solution, drying of the applied film, and decomposition of octylic acid were repeated 15 times. After that, the resultant was heated in vacuum ($10^{-3}$ to $10^{-4}$ Pa) at 900° C. for 30 minutes to crystallize the applied film. Through this process, columnar crystallization was suppressed. The resultant film thickness was 800 nm. Compositional analysis of the film using fluorescent X-rays was performed to confirm that the composition of the crystallized film is the same as the feed composition of each of the solutions in Table 9. Further, a cross-sectional structure of the dielectric layer was observed using a scanning electron microscope (SEM) and a transmission electron microscope (TEM). As a result of the observation, all compositions in Table 9 were confirmed to be the dielectric layer having the granular structure. As an example, a TEM image of a cross-sectional structure of a dielectric layer in Comparative example 19 is shown in FIG. 4.

Next, an upper electrode layer was formed by sputtering Ni of 500 nm and Cu of 2000 nm on the dielectric layer. Next, in order to fabricate a chip-type capacitor element having a size of length 1 mm×width 0.5 mm (1005 element), the upper electrode layer and the dielectric layer were patterned, and thereafter, an insulating layer was formed of polyimide resin. In forming the insulating layer, in order to form an extraction electrode from the Ni foil side and the upper electrode layer side, via holes were formed in the insulating layer by photolithography.

Next, on the insulating layer in which the via holes were formed, a Ti layer of 20 nm was formed by sputtering, and subsequently a Cu layer of 500 nm was formed. Cu plating was performed with the Ti layer and the Cu layer being used as a seed electrode layer to fabricate the extraction electrodes in the via holes and then terminal electrodes having a predetermined shape. A thickness of the terminal electrode was 10 μm. After that, the seed electrode layer was removed except for portions of the terminal electrodes to fabricate a thin film capacitor of 1005 element. On the Ni foil of 100×100 mm 8000 capacitors were formed. After that, a single body of the 1005 element was fabricated by dicing.

The capacitance at no DC loading and insulation resistance of the finished 1005 element were measured in such a manner that 10 samples were measured per one measurement. The capacitance was measured using an LCR meter 4284A manufactured by Agilent Co. at 1 kHz, 1 Vrms, and a room temperature. The insulation resistance was measured using a high-resistance meter 4339B manufactured by Agilent Co. at DC 4V and a room temperature. Results of an average of the measured values of several tens of samples are shown in Table 10.

Next, the capacitance at DC bias application was evaluated. The number of samples per one measurement was ten for each composition. A change rate of the capacitance by DC 5V application relative to the capacitance at no DC loading was obtained. An average of values of several tens of samples is shown in Table 10.

Next, the biased humidity reliability of the sample for each composition was evaluated. The number of the evaluated samples for each composition was 20, and the samples were tested at DC 4 V, 60° C., and 95% RH for 2000 hours. The insulation resistances of the samples before and after the test were measured at DC 4V, and those of the samples not reduced in the insulation resistance to 1/50 of that before the test were evaluated as good products. A ratio of the samples determined as a good product even after the test is shown in Table 10.

TABLE 9

| | | $(Ba_{1-a-b}Sr_aCa_b)_yTi_{1-c}Zr_cO_3$ | | | | Al | Mn | V | Nb | Ta | Y |
|---|---|---|---|---|---|---|---|---|---|---|---|
| | | a | b | y | c | (mol %) | | | | | |
| 85 | Comparative example 21 | 0 | 0 | 0.995 | 0 | 1 | 0.2 | 0.2 | 0 | 0 | 0.1 |
| 86 | Comparative example 22 | 0 | 0 | 0.99 | 0 | 1 | 0.2 | 0.2 | 0 | 0 | 0.1 |
| 87 | Comparative example 23 | 0 | 0 | 0.98 | 0 | 1 | 0.2 | 0.2 | 0 | 0 | 0.1 |
| 88 | Comparative example 24 | 0 | 0 | 0.97 | 0 | 1 | 0.2 | 0.2 | 0 | 0 | 0.1 |

TABLE 10

| | | Capacitance (nF) | Insulation resistance (Ω) | Capacitance change rate by DC bias (%) | Biased humidity reliability Number conforming/ Number input |
|---|---|---|---|---|---|
| 85 | Comparative example 21 | 2.81 | $1.2 \times 10^{10}$ | −37.5 | 0/20 |
| 86 | Comparative example 22 | 2.75 | $1.1 \times 10^{10}$ | −38.2 | 0/20 |
| 87 | Comparative example 23 | 2.74 | $1.8 \times 10^{10}$ | −39.1 | 0/20 |
| 88 | Comparative example 24 | 2.30 | $1.1 \times 10^{10}$ | −39.8 | 0/20 |

These thin film capacitors are in a preferable scope of the invention as for a composition range of the dielectric layer, but reduced in the capacitance as compared with a thin film capacitor having the dielectric layer of the columnar structure because the fine structure of the film is the granular structure. Further, it was found that the biased humidity reliability is not kept at all. Containing Al has the similar effect on the reduction in the capacitance in DC bias application, but the biased humidity reliability is deteriorated. For this reason, the fine structure of the film is required to have the columnar structure.

What is claimed is:

1. A thin film capacitor comprising: a base material; a dielectric layer provided on the base material; and an upper electrode layer provided on the dielectric layer, wherein the dielectric layer includes a plurality of columnar crystals that extend along a normal direction with respect to a surface of the upper electrode layer, the columnar crystals have a perovskite crystal structure represented by $A_yBO_3$, an element A is at least one of Ba, Ca, Sr, and Pb, an element B is at least one of Ti, Zr, Sn, and Hf, y≤0.995 is satisfied, and the dielectric layer contains 0.3 to 2.5 mol of Al per 100 mol of $A_yBO_3$.

2. The thin film capacitor according to claim 1, wherein the dielectric layer further contains 0.05 to 0.45 mol of Mn per 100 mol of $A_yBO_3$.

3. The thin film capacitor according to claim 1, wherein the dielectric layer further contains at least one of V, Nb, and Ta, and total content of V, Nb, and Ta is 0.05 to 0.5 mol per 100 mol of $A_yBO_3$.

4. The thin film capacitor according to claim 1, wherein the dielectric layer further contains at least one of rare-earth elements, and total content of the rare-earth elements is 0.05 to 0.3 mol per 100 mol of $A_yBO_3$.

5. The thin film capacitor according to claim 1, wherein 0.97≤y≤0.995 holds.

6. The thin film capacitor according to claim 1, wherein the base material is a metal foil that contains Ni as a principal component.

* * * * *